(12) United States Patent  (10) Patent No.: US 6,252,500 B1
Chueh et al.  (45) Date of Patent: Jun. 26, 2001

(54) WARNING EDGE STRIP FOR CAR DOORS

(76) Inventors: Hung-Pin Chueh, No. 12, Lane 158, Dah-Hwa St., Ney-Hwu district, Taipei City (TW); Fu-Juh Shyu, No. 10, Alley 7, Lane 89, Dong-Shin Rd., Nan-Gaang District, Taipei City (TW)

( * ) Notice: Subject to any disclaimer, the term of this patent is extended or adjusted under 35 U.S.C. 154(b) by 0 days.

(21) Appl. No.: 09/670,552

(22) Filed: Sep. 27, 2000

(51) Int. Cl.[7] .................................... B60Q 1/52
(52) U.S. Cl. ..................... 340/472; 340/438; 340/463; 340/691.1; 362/464; 362/501; 362/800
(58) Field of Search .................... 340/438, 458, 340/463, 468, 471, 472, 691.1; 362/800, 464, 501

(56) References Cited

U.S. PATENT DOCUMENTS

| | | | |
|---|---|---|---|
| 4,912,454 | * 3/1990 | Solow | 340/472 |
| 5,121,098 | * 6/1992 | Chen | 340/457 |
| 5,193,895 | * 3/1993 | Naruke et al. | 362/501 |
| 5,828,299 | * 10/1998 | Chen | 340/468 |
| 6,184,786 | * 2/2001 | Medeiros | 340/472 |

* cited by examiner

Primary Examiner—Daniel J. Wu
(74) Attorney, Agent, or Firm—Bacon & Thomas, PLLC

(57) ABSTRACT

The present invention provides a warning edge strip which is disposed at the edge of car doors and on whose rear side a light fitting and a detection loop are mounted. When the detection loop detects that the door is opened, a signal is immediately given to control the light fitting for lighting up or flashing in order to warn the vehicle behind that the door is going to be opened. The light fitting is lamp bulb, light emitting diode or luminescent plate which can be embedded.

3 Claims, 6 Drawing Sheets

WARNING EDGE STRIP FOR CAR DOORS

BACKGROUND OF THE INVENTION

1. Field of the Invention

The present invention relates to a warning edge strip and, more particularly, to a warning edge strip mounted at the edge of car doors and giving a warning light in opening the car door.

2. Description of the Prior Art

At present, the traffic at all metropolis all over the world is chaotic. The car and the motorcycle on the city roads can't be effectively separated. Therefore, it's very dangerous that the opening door of a car is often hit by the coming motorcycle behind because the car can't drive to the side of the road for stop, especially for the situation when the passengers get in or get out of the taxi at the big cities. The reason for that lies in that no warning device is installed to inform the coming vehicle behind.

SUMMARY OF THE INVENTION

It is a primary object of the present invention to remove the above-mentioned drawbacks and to provide a warning edge strip which is disposed at the edge of car doors and on whose rear side a light fitting and a detection loop are mounted. When the detection loop detects that the door is opened, a signal is immediately given to control the light fitting for lighting up or flashing in order to warn the vehicle behind that the door is going to be opened. Accordingly, a collision accident can be avoided.

It is a further object of the present invention to provide a warning edge strip for car doors warning in which the light fitting is lamp bulb, light-emitting diode or luminescent plate which can be embedded.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
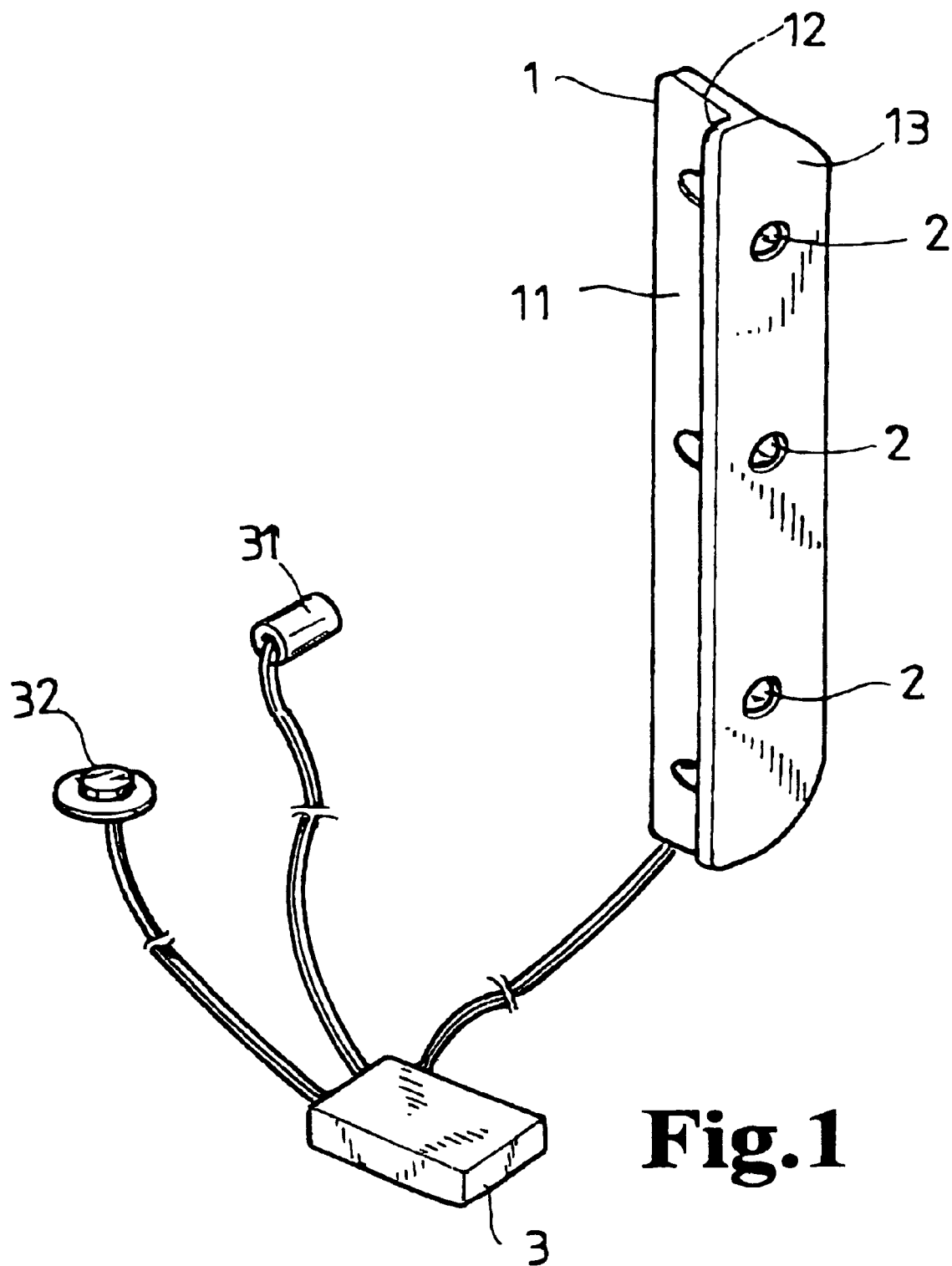
FIG. 1 is a perspective view of the present invention.

Referring to FIG. 1, the present invention primarily includes a soft edge strip 1 (preferable made form rubber) having an attachment face 11 being screwed into the car door plate 4. Therefore, the soft edge strip 1 is mounted along the car door edge. A small protruding rim 12 being vertical to the attachment face 11 is formed at the end of the attachment face 11 to facilitate the fixing of the edge strip (see FIG. 3).

Figure 3:
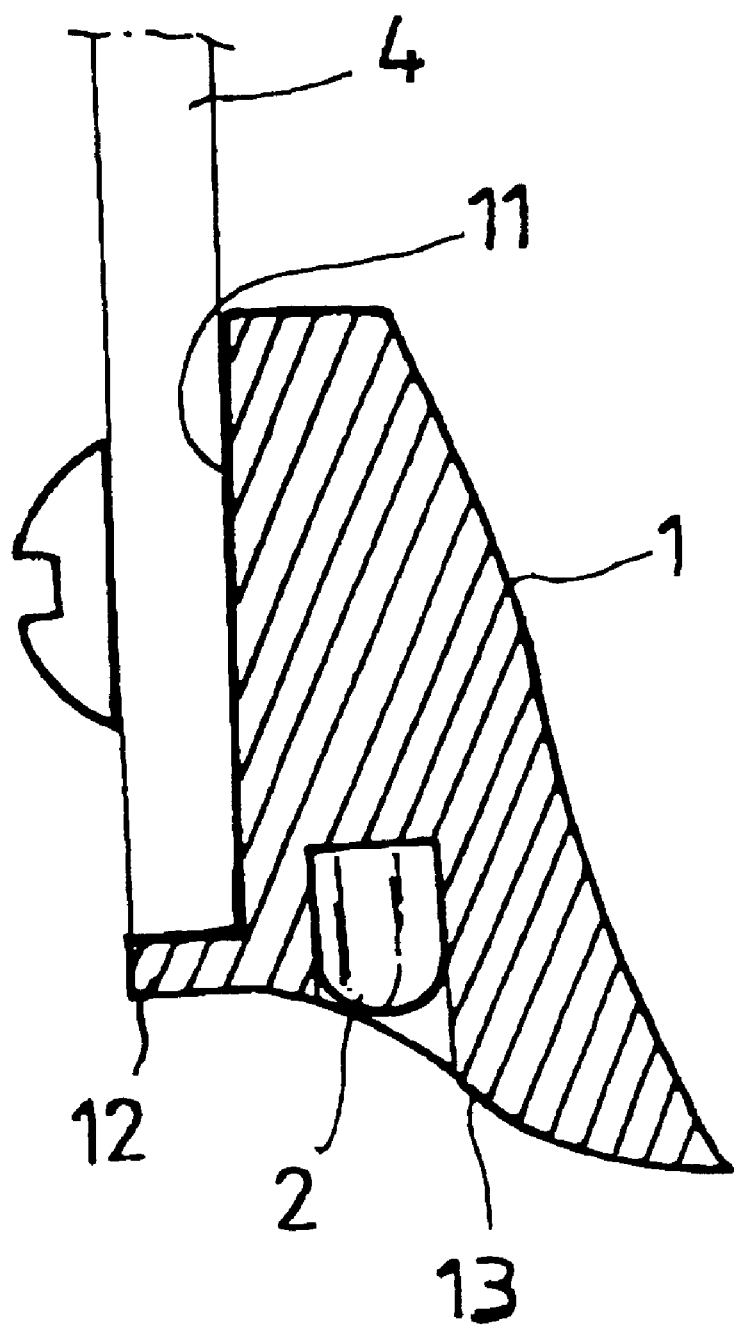
FIG. 3 is a sectional view of the present invention.

A light fitting 2 is disposed on the back side 13 of the soft edge strip 1. The diode, as shown in FIG. 1, is embedded in the soft edge strip 1 while the lighting part appears on the surface of the back side 13, as shown in FIG. 3.

A detection loop 3 is used to detect the opening action of the car door. A detector 31, for example, is mounted on the door lock. When the door is unlocked (the passenger opens the door), the detector 31 gives a signal to the detection loop 3 which then controls the lighting or flashing of the light fitting 2. Accordingly, a warning effect can be achieved.

Figure 6:
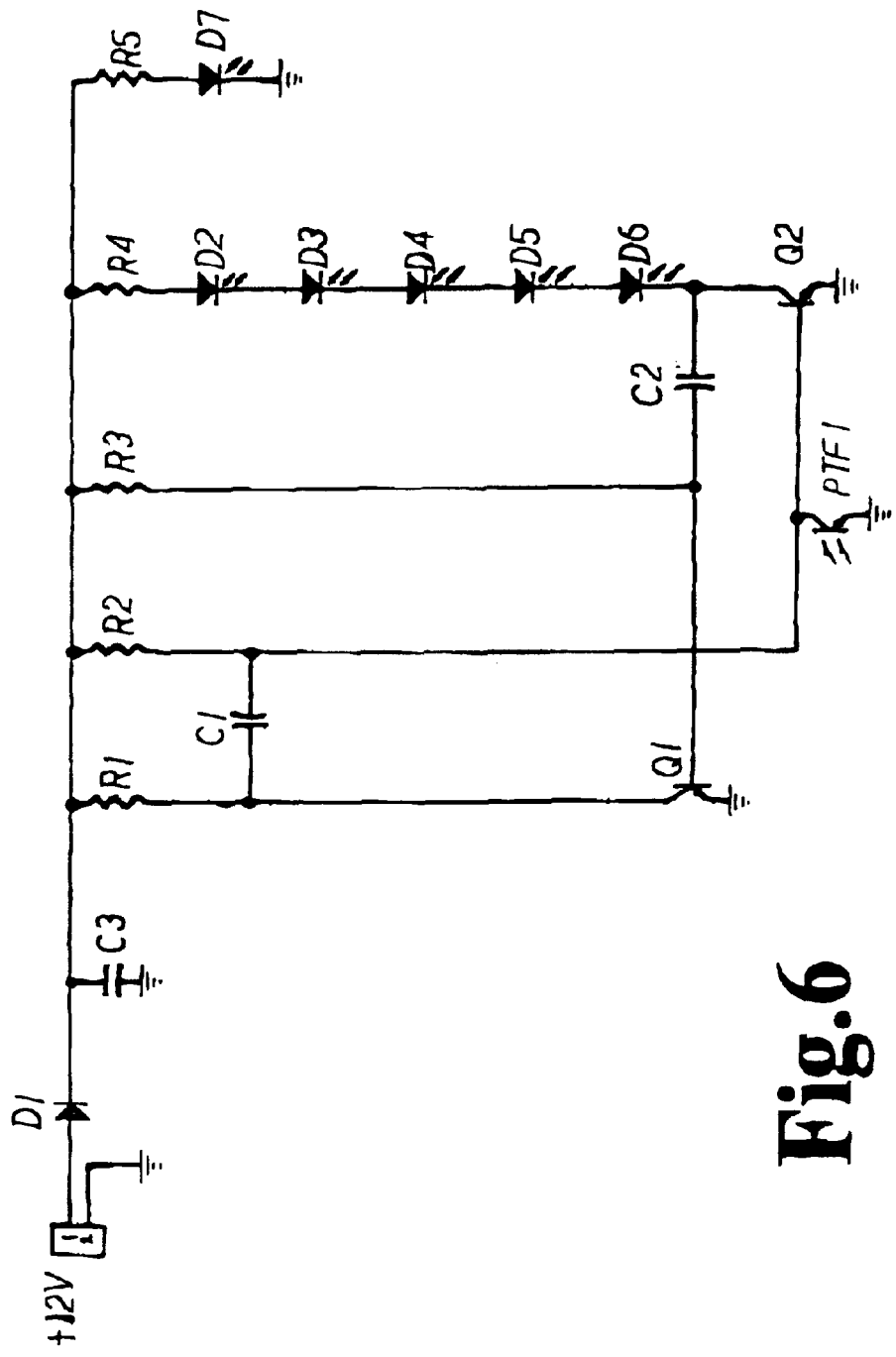
FIG. 6 is a circuit diagram of the control loop of the present invention.

FIG. 6 shows a circuit diagram of the control loop of the present invention. A light-emitting diode (D1) and a capacitor (C3) offer a stable 12 V-voltage. Two transistors (Q1, Q2) serve as clock to create a fixed oscillation frequency. A light-emitting diode (D7) and a light-sensing transistor (PTF1) are mounted on the door and the door frame respectively, and they are used to detect the opening or the closing of the car door and to control the light bulbs (D2 through D6). When the door is closed, the light of the light-emitting diode (D7) will be sensed by the light-sensing transistor (PTF1) in order to make the light bulbs (D2 through D6) in an extinguished state. When the door is slightly opened, the light-sensing transistor (PTF1) is located beyond the light-emitting range of the light-emitting diode (D7) so that the light bulbs (D2 through D6) immediately light up.

Figure 4:
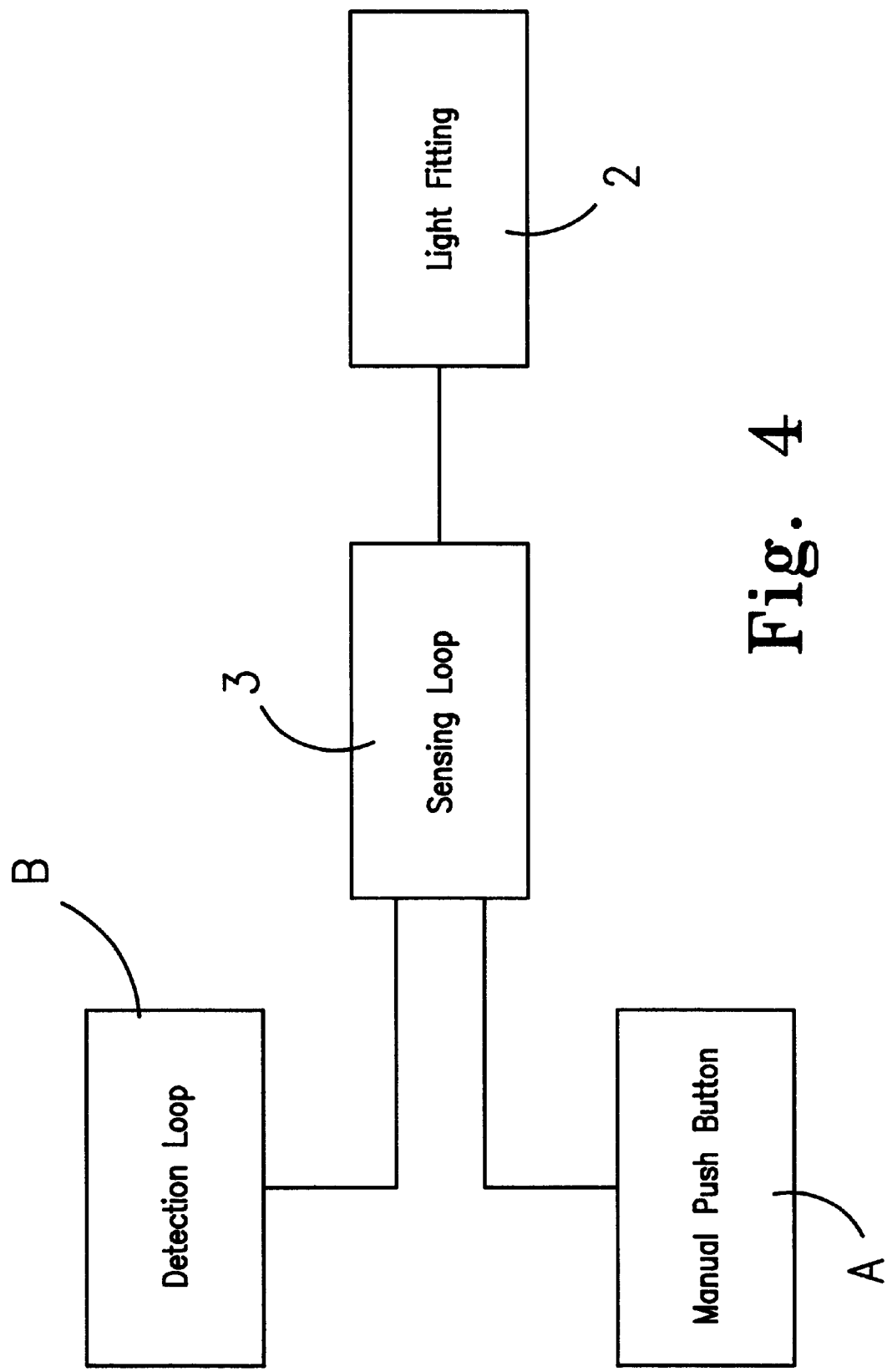
FIG. 4 is a block diagram of the manual control loop of the present invention.

Furthermore, a manual control loop is installed on the detection loop 3. In using, it's only necessary to press a manual push button 32 for controlling the lighting or flashing of the light fitting 2. Accordingly, the manual push button 32 can be mounted near the driver seat in order for the driver to control it. For example, the taxi driver can make the light fitting 2 in a lighting state before the passengers open the door in order to warn the coming vehicle behind that the door is going to be opened. The complete control procedure is shown in FIG. 4.

Figure 2:
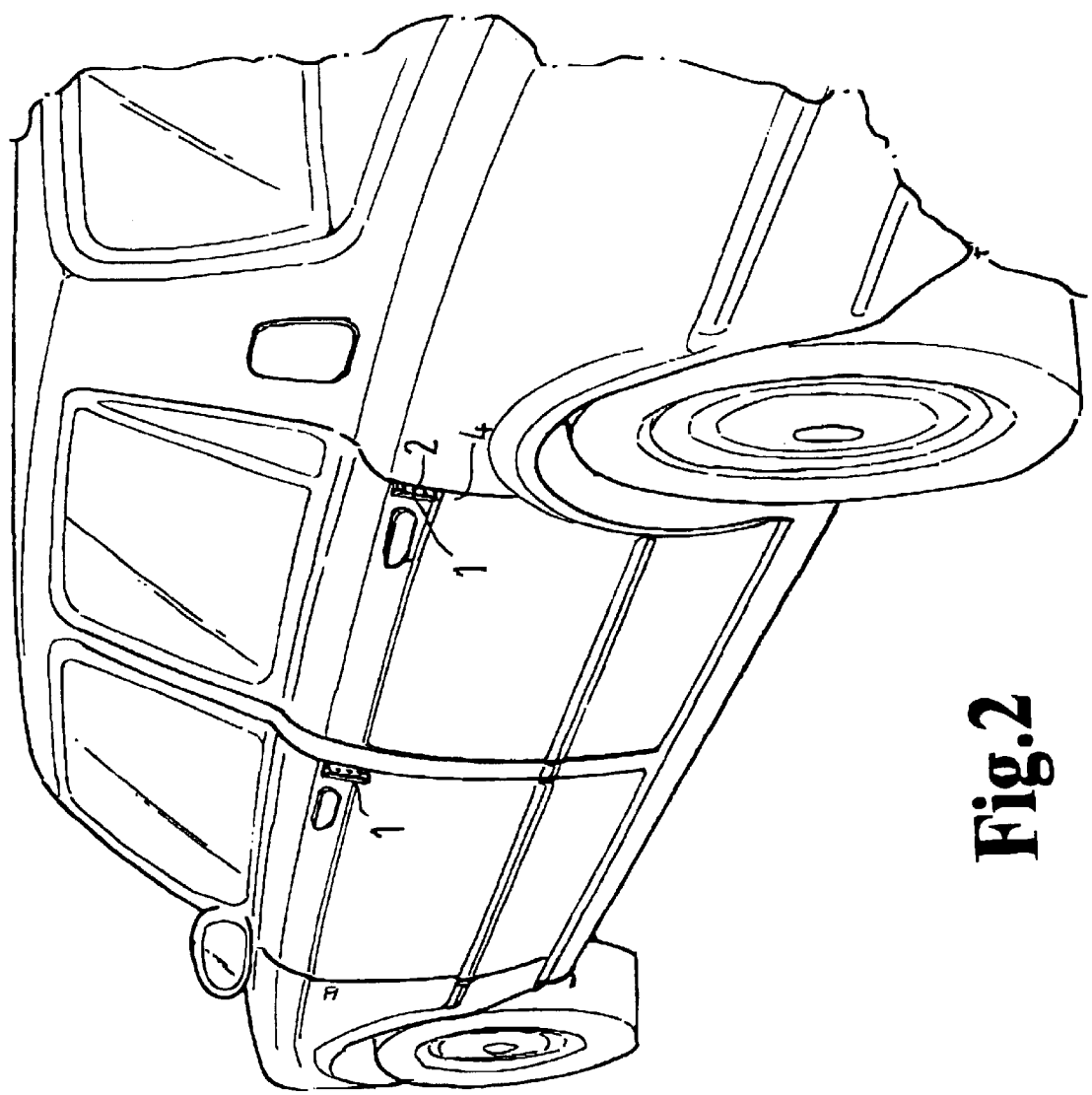
FIG. 2 is a perspective view of the present invention mounted on car doors.

Referring to FIG. 2, the present invention is installed at the outer side of the door edge of the car while the back side 13 of the soft edge strip 1 directs toward the rear side. Accordingly, only if the light fitting 2 emits proper light beams, the coming vehicle behind will be warned that the door is going to be opened in order to avoid the collision.

Figure 5:
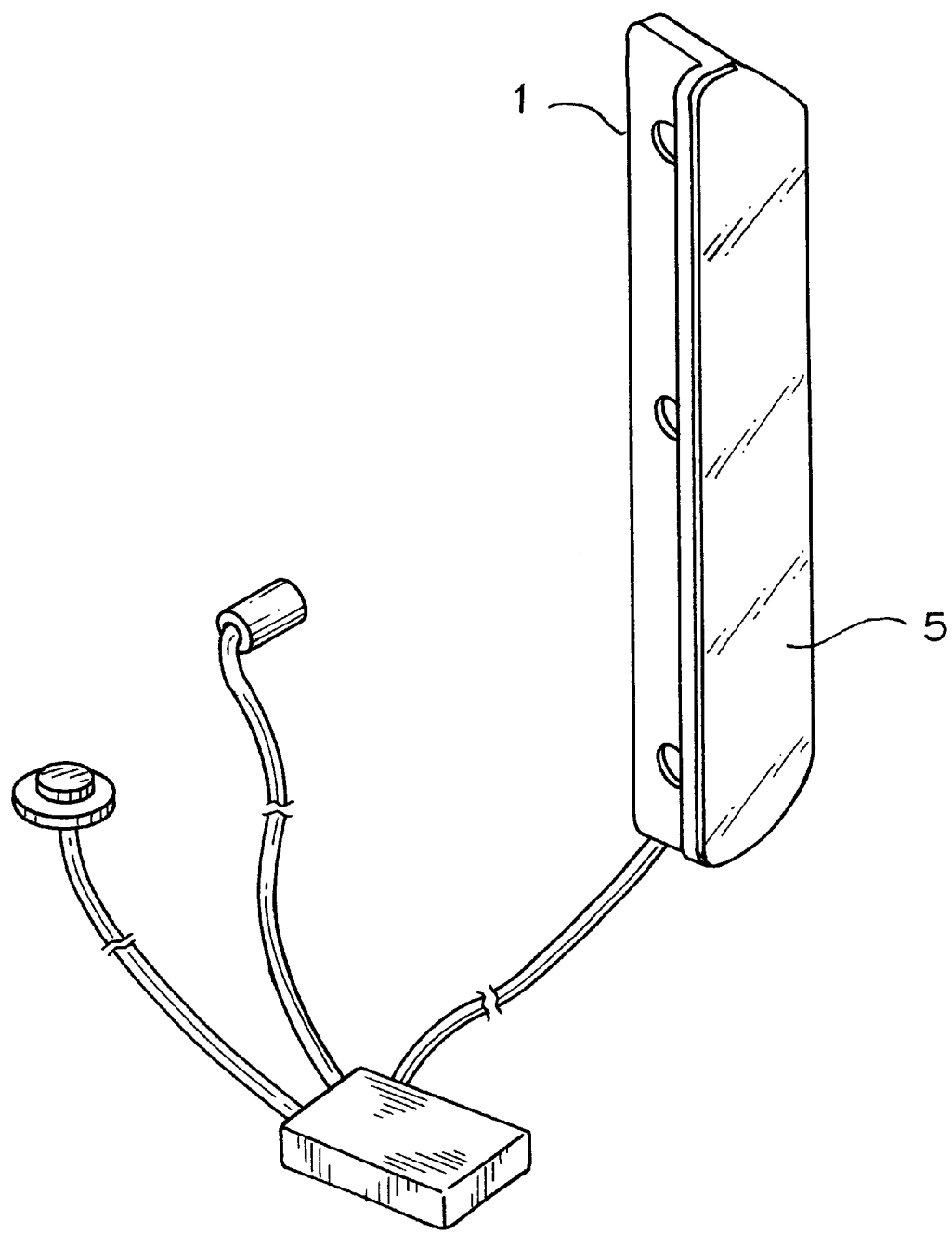
FIG. 5 is a further embodiment of the present invention in which the light bulb is replaced by the luminescent plate.

FIG. 5 shows a further embodiment of the present invention in which the light fitting 2 is replaced by a luminescent plate 5. The luminescent plate 5 is easily attached to the back side of the soft edge strip 1 by means of its thin layer.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A warning edge strip for car doors comprising:
    a soft edge strip mounted along the edge of the car door,
    a light fitting installed at the rear side of said soft edge strip; and
    a detection loop used to detect the opening action of the door in order to control the lighting-up or the flashing of said light fitting,
wherein a light-emitting diode and a light-sensing transistor are mounted on the door and the door frame respectively and are used to detect the opening or the closing of the car door, and when the door is closed, the refracted light of said light-emitting diode will be sensed by the light-sensing transistor in order to make said light fitting in an extinguished state, and when the door is slightly opened, the light-sensing transistor is located beyond the light refraction range of the light-emitting diode so that said light fitting immediately lights up in order to achieve a warning effect, and wherein a manual control loop is used to control the lighting-up of said light fitting when a manual push button is pressed.

2. A warning edge strip as claimed in claim 1, wherein said light fitting is lamp bulb or light-emitting diode, and it is embedded inside of said soft edge strip.

3. A warning edge strip as claimed in claim 1, wherein said light fitting is luminescent plate attached to the rear side of said soft edge strip.

* * * * *